United States Patent
Zhuang et al.

(10) Patent No.: US 9,960,866 B1
(45) Date of Patent: May 1, 2018

(54) METHOD AND APPARATUS FOR SIGNAL-TO-NOISE RATIO (SNR) ESTIMATION

(71) Applicant: Samsung Electronics Co., Ltd., Gyeonggi-do (KR)

(72) Inventors: Binnan Zhuang, San Diego, CA (US); Hongbing Cheng, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/421,998

(22) Filed: Feb. 1, 2017

Related U.S. Application Data

(60) Provisional application No. 62/414,143, filed on Oct. 28, 2016.

(51) Int. Cl.
*H04B 17/00* (2015.01)
*H04B 17/336* (2015.01)
*H04B 17/318* (2015.01)

(52) U.S. Cl.
CPC ........ *H04B 17/336* (2015.01); *H04B 17/318* (2015.01)

(58) Field of Classification Search
CPC ............................ H04B 17/336; H04B 17/318
USPC ...................................................... 455/226.3
See application file for complete search history.

(56) References Cited

U.S. PATENT DOCUMENTS

| | | | |
|---|---|---|---|
| 4,555,790 A * | 11/1985 | Betts | ........................ H04L 1/206 327/552 |
| 6,081,822 A * | 6/2000 | Hillery | ..................... G06F 7/552 708/200 |
| 7,027,496 B2 | 4/2006 | Tapaninen | |
| 7,313,167 B2 | 12/2007 | Yoon et al. | |
| 7,414,581 B2 | 8/2008 | Vallot | |
| 7,848,469 B2 | 12/2010 | Majonen | |
| 8,098,770 B2 | 1/2012 | Shusterman | |
| 8,767,799 B2 | 7/2014 | Wang et al. | |
| 9,106,472 B1 | 8/2015 | Kroeger et al. | |
| 2007/0011639 A1* | 1/2007 | Pitts | ..................... G06F 17/5072 716/52 |
| 2008/0022162 A1* | 1/2008 | Qiu | ..................... H04B 17/336 714/704 |
| 2015/0163686 A1 | 6/2015 | Zhang et al. | |
| 2016/0173150 A1 | 6/2016 | Kravtsov et al. | |

FOREIGN PATENT DOCUMENTS

CN 103402249 11/2013
EP 3035567 6/2016

* cited by examiner

*Primary Examiner* — Sanh Phu
(74) *Attorney, Agent, or Firm* — The Farrell Law Firm, P.C.

(57) ABSTRACT

A method and apparatus are provided. The method includes receiving a signal sequence and a noise sequence, determining a first absolute value sum approximation of a receive power of the signal sequence, determining a second absolute value sum approximation of a noise power of the noise sequence, and determining a signal-to-noise ratio (SNR) based on the first absolute value sum approximation and the second absolute value sum approximation.

16 Claims, 7 Drawing Sheets

METHOD AND APPARATUS FOR SIGNAL-TO-NOISE RATIO (SNR) ESTIMATION

PRIORITY

This application claims priority under 35 U.S.C. § 119(e) to U.S. Provisional Patent Application No. 62/414,143 which was filed in the U.S. Patent and Trademark Office on Oct. 28, 2016, the entire content of which is incorporated herein by reference.

FIELD

The present disclosure generally relates to signal processing, and more particularly, to a method and apparatus for signal-to-noise ratio (SNR) estimation.

BACKGROUND

A signal-to-noise ratio (SNR) is a measure that compares the level of a desired signal to the level of noise in a wireless receiver. It is defined as the ratio of desired signal power to the noise power, and may be expressed in decibels. A desired signal power and a noise power may be measured by averaging over all receive samples in the signal and noise sequences, respectively. To reduce complexity in the hardware implementation of the receiver, an absolute value sum may be used. However, the noise power included in the total received signal power with the absolute value sum approximation cannot be canceled through direct subtraction.

SUMMARY

According to an aspect of the present disclosure, a method is provided which includes The method includes receiving a signal sequence and a noise sequence, determining a first absolute value sum approximation of a receive power of the signal sequence, determining a second absolute value sum approximation of a noise power of the noise sequence, and determining a signal-to-noise ratio (SNR) based on the first absolute value sum approximation and the second absolute value sum approximation.

According to another aspect of the present disclosure, an apparatus is provided which includes a memory, a processor, and a receiver configured to receive a signal sequence and a noise sequence, determine a first absolute value sum approximation of a receive power of the signal sequence, determine a second absolute value sum approximation of a noise power of the noise sequence, and determine a signal-to-noise ratio (SNR) based on the first absolute value sum approximation and the second absolute value sum approximation.

According to another aspect of the present disclosure, an apparatus is provided which includes a memory, a processor, and a receiver configured to receive a signal sequence and a noise sequence, determine a first absolute value sum approximation of a receive power of the signal sequence, determine a second absolute value sum approximation of a noise power of the noise sequence, and determine a signal-to-noise ratio (SNR) based on the first absolute value sum approximation and the second absolute value sum approximation.

According to another aspect of the present disclosure, a method of manufacturing a processor is provided which includes forming the processor as part of a wafer or package that includes at least one other processor, wherein the processor is configured to receive a signal sequence and a noise sequence, determine a first absolute value sum approximation of a receive power of the signal sequence, determine a second absolute value sum approximation of a noise power of the noise sequence, and determine a signal-to-noise ratio (SNR) based on the first absolute value sum approximation and the second absolute value sum approximation.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to receive a signal sequence and a noise sequence, determine a first absolute value sum approximation of a receive power of the signal sequence, determine a second absolute value sum approximation of a noise power of the noise sequence, and determine a signal-to-noise ratio (SNR) based on the first absolute value sum approximation and the second absolute value sum approximation.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
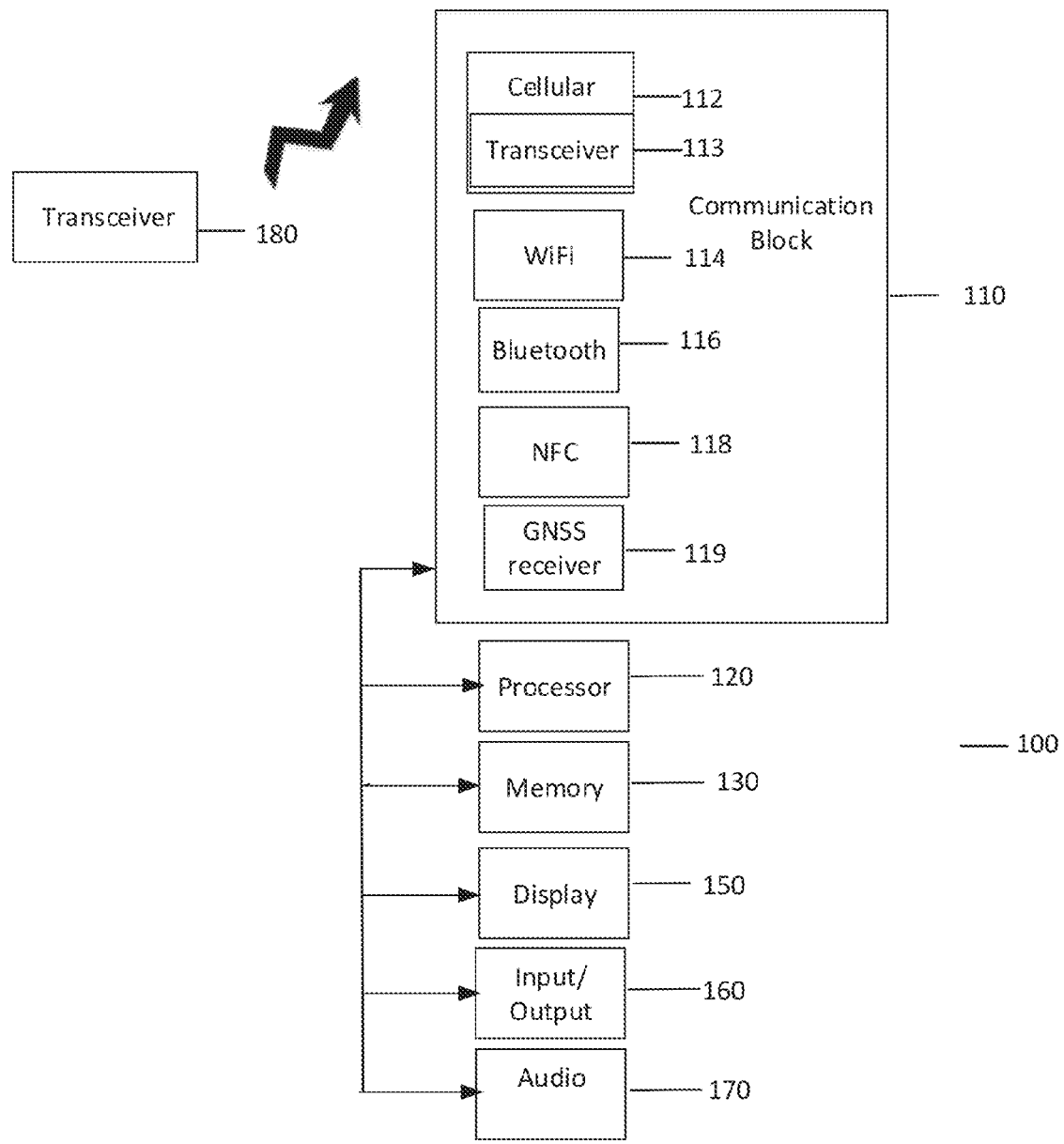
FIG. 1 is a block diagram of an electronic device in a communication network, according to an embodiment of the present disclosure.

FIG. 1 is a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170 and a wireless transceiver 180. The wireless transceiver 180 may be included in a user equipment or a Wi-Fi access point or cellular base station and includes, but is not limited to, a wireless transmitter and receiver.

The electronic device 100 includes a communication block 110 for connecting the electronic device 100 to another electronic device or a network for communication of voice and data. The communication block 110 provides general packet radio service (GPRS), enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The transceiver 113 includes, but is not limited to, a transmitter and a receiver. The wireless fidelity (Wi-Fi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a Wi-Fi access point or a terrestrial base transceiver station (BTS) (such as a cellular base station) and include a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or Wi-Fi block 114. The Wi-Fi block 114 may also have a local processor or a chipset which dedicates computing resources to Wi-Fi block 114 and other functional blocks such as signal to noise estimation blocks.

The memory 130 provides storage for device control program code, user data storage, application code and data storage. The memory 130 may provide data storage for the firmware, libraries, databases, lookup tables, algorithms, methods, SNR estimation parameters, and calibration data required by the cellular communications block 112 or Wi-Fi block 114. The program code and databases required by the cellular communications block 112 or Wi-Fi block 114 may be loaded into local storage from the memory 130 upon device boot up. The cellular communications block 112 or Wi-Fi block 114 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The wireless transceiver 180 may be included in a user equipment or an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), servers or a combination thereof. The wireless transceiver 180 may be used to transmit the communication signals, such as voice or data.

A direct SNR estimation may be based on determining a total receive power, $P_{total}$ (including signal and noise) and a noise power $\sigma^2$ using a power sum. The linear domain SNR may be calculated as follows in Equation (1):

$$SNR = \frac{P_{total} - \sigma^2}{\sigma^2} \quad (1)$$

A linear to decibel (dB) conversion may be used to determine a dB domain SNR estimation of the linear domain SNR. $SNR_{dB}$ may be calculated as follows in Equation (2):

$$SNR_{dB} = 10 \cdot \log_{10}(SNR) \quad (2)$$

When the SNRs from two receive (Rx) antennas need to be combined, the sum of the SNRs from the two Rx antennas may be calculated in the linear domain, and then converted to the dB domain. The sum of the SNRs from the two Rx antennas may be calculated as follows in Equation (3):

$$SNR_{sum,dB} = 10 \cdot \log_{10}(SNR_0 + SNR_1) \quad (3)$$

where $SNR_0$ and $SNR_1$ are the estimated SNRs at Rx antenna 0 and Rx antenna 1 in the linear domain, respectively.

According to an embodiment of the present disclosure, the present system and method provides an absolute value sum approximation of a total received power and noise power to estimate a total receive power and noise power from multiple Rx antennas. Since the estimation is in a root mean square domain, the noise term contained within the total receive signal cannot be easily removed. The present system and method provide a bias compensation to remove the effect of the noise term from the total power. Since the SNR is estimated in a dB domain, the present system and method may directly combine two SNR estimations in the dB domain to get the sum SNR in dB.

According to an embodiment of the present disclosure, the present system and method provides bias compensation to improve SNR measurement accuracy and reduce the estimation bias with an absolute value sum. The present system and method further provides a sum SNR approximation instead of a power sum to reduce computational complexity. However, a direct implementation may induce a large positive bias in the case of a low SNR. The present system and method provides compensation to cancel the positive bias especially in the case of a low SNR. Since the per-antenna SNR estimation output is in a dB domain, the present system and method combines the estimations from two Rx antennas.

According to an embodiment of the present disclosure, the per-antenna SNR estimation is obtained in the dB domain to avoid using a division block in the estimation which may increase computational complexity. In the case of two Rx antennas, the sum SNR may be required to maintain receiver performance. The present system and method directly combines and determines the sum SNR in the dB domain using the per-antenna SNR in the dB domain. Although the present disclosure describes an example of two Rx antennas, the present system and method may be extended to the SNR combination from any two branches instead of two antennas, (e.g., two different frequency bands or two time slots), without deviating from the scope of the present disclosure. The present system and method may also be extended to the case of combining more than two branches or two Rx antennas by cascading the combination of the two branches or Rx antennas.

A total received signal (desired signal plus noise) sequence may include a signal sequence $s_i$ and a noise sequence $n_i$ as follows in Equation (4):

$$y_i = s_i + n_i, \; i=1, \ldots, m \quad (4)$$

where $s_i$ and $n_i$ are assumed to be independent and identically distributed according to a Gaussian distribution.

A separately measured noise sequence may be calculated as follows:

$$z_i = n_i', \; i=1, \ldots, m \quad (5)$$

which has the same statistics as $n_i$ in $y_i$ of Equation (4) above. For example, the sequence $z_i$ may be captured during a period of time when no signal transmissions are occurring.

A method for estimating SNR may include first estimating the signal power $P_s$ and noise power $P_n$ which may be calculated as follows in Equations (6) and (7):

$$P_s = \frac{1}{m} \sum_{i=1}^{m} |y_i|^2 \quad (6)$$

$$P_n = \frac{1}{m} \sum_{i=1}^{m} |z_i|^2 \quad (7)$$

The SNR in dB may be calculated as follows in Equations (8) and (9):

$$SNR_{dB} = 10 \cdot \log_{10}\left(\frac{P_s - P_n}{P_n}\right) \quad (8)$$

$$SNR_{dB} = 10 \cdot \log_{10}(P_s - P_n) - 10 \cdot \log_{10}(P_n) \quad (9)$$

where Equation (9) may be used to eliminate the division operation of Equation (8) and reduce computational complexity.

To reduce the computational complexity of a power sum, an absolute value sum may be determined for each of the total received signal sequence and the noise sequence, where the absolute value sums are respectively determined as follows in Equations (10) and (11):

$$A_s = \frac{1}{m} \sum_{i=1}^{m} |s_i + n_i| \quad (10)$$

$$A_n = \frac{1}{m}\sum_{i=1}^{m}|n_i|. \tag{11}$$

The SNR in dB may be calculated as follows in Equations (12) and (13):

$$SNR_{dB} \approx 20 \cdot \log_{10}\left(\frac{A_s}{A_n}\right) \tag{12}$$

$$SNR_{dB} = 20 \cdot \log_{10}(A_s) - 20 \cdot \log_{10}(A_n). \tag{13}$$

Since $A_s$ contains both the signal and the noise power portion, the estimation will have a positive bias especially in the case of low SNR regimes. Since $y_i$ in Equation (4) above is the sum of two independent Gaussian random variables, it is also a Gaussian random variable. The magnitude of a Gaussian random variable is Rayleigh distributed. Therefore, the following equations are obtained as shown in Equations (14) and (15):

$$A_s \cong \frac{\sqrt{\pi}}{2}\sqrt{P_s + P_n} \tag{14}$$

$$A_n \cong \frac{\sqrt{\pi}}{2}\sqrt{P_n}. \tag{15}$$

The noise may not be directly subtracted in a root mean square domain. According to an embodiment of the present disclosure, the present system and method provides the following bias compensation scheme as shown in Equations (16), (17) and (18):

$$SNR_{dB} = 10 \cdot \log_{10}\left(\frac{A_s^2 - A_n^2}{A_n^2}\right) \tag{16}$$

$$SNR_{dB} = 10 \cdot \log_{10}((A_s + A_n)(A_s - A_n)) - 10 \cdot \log_{10}(A_n^2) \tag{17}$$

$$SNR_{dB} = 10 \cdot \log_{10}(A_s + A_n) + 10 \cdot \log_{10}(A_s - A_n) - 20 \cdot \log_{10}(A_n). \tag{18}$$

Figure 2:
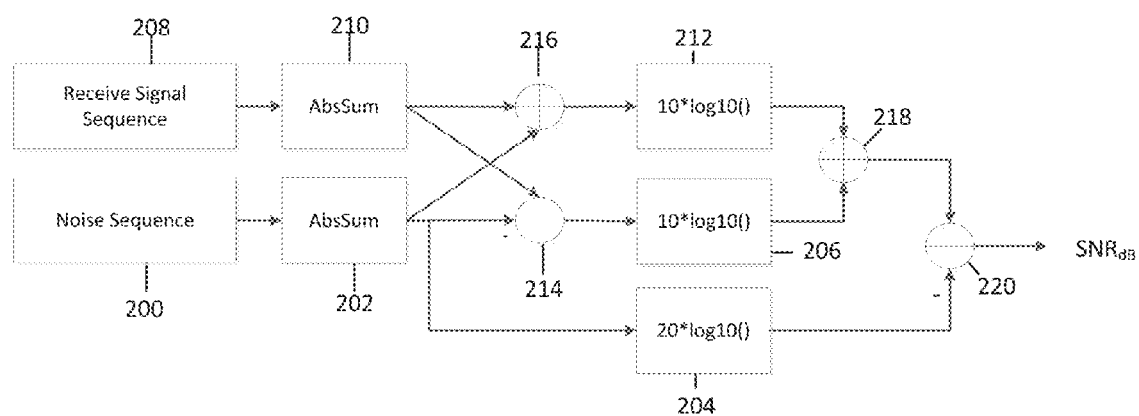
FIG. 2 is a block diagram of a circuit that performs an SNR estimation method using bias compensation, according to an embodiment of the present disclosure.

FIG. 2 is a block diagram of a circuit that performs an SNR estimation method using bias compensation, according to an embodiment of the present disclosure.

Referring to FIG. 2, a circuit that performs an SNR estimation method using bias compensation includes a receive signal sequence 208, a noise sequence 200, a first and a second absolute value summation blocks AbsSum block 210 and AbsSum block 202, a first adder circuit 216, a second adder circuit 218, a first subtractor circuit 214, a second subtractor circuit 220 and a first, a second, and a third dB conversion blocks 204, 206, and 212.

Referring to FIG. 2, the present system may receive the receive signal sequence 208 having a desired signal sequence and a noise sequence. The present system may determine the noise sequence 200 using Equation (5) above. According to an embodiment of the present disclosure, the present system receives the noise sequence 200. The AbsSum block 210 determines the absolute value sum of the receive signal sequence 208. The AbsSum block 210 and the AbsSum block 202 perform a summation of the absolute values of the received signal sequence 208 and the noise sequence 200 respectively. The AbsSum sum block 202 determines the absolute value sum of the noise sequence 200. The first adder circuit 216 sums the outputs from the AbsSum block 210 and the AbsSum block 202. The third dB conversion block 212 converts the output of the first adder circuit 216 into a decibel value. The first subtractor circuit 214 subtracts the output of the AbsSum block 202 from output of the AbsSum block 210. The second dB conversion block 206 converts the output of the first subtractor circuit 214 into a decibel value. The first dB conversion block 204 converts the output of the AbsSum block 202 to decibels. The second adder circuit 218 sums the outputs of the third and the second dB conversion blocks 212 and 206 in accordance with Equation (18) above. The second subtractor circuit 220 subtracts the output of the first dB conversion block 204 from the output of the second adder circuit 218. The log calculations in the first, second, and third dB conversion blocks 204, 206, and 212 may be realized by various methods, for example, by using a look-up table (LUT) stored in memory.

In the case of two Rx antennas, the SNR estimation at each Rx antenna represented as $SNR_{0,dB}$ and $SNR_{1,dB}$ respectively, may be estimated using the absolute value sum approach with bias cancellation. The present system and method may further determine a sum SNR in the dB domain without converting back to the linear domain. The corresponding per antenna SNR in the linear domain may be represented as $SNR_0$ and $SNR_1$, respectively, for the two Rx antennas, and the sum SNR in the dB domain may be calculated as follows in Equation (19):

$$SNR_{sum,dB} = 10\log_{10}(SNR_0 + SNR_1) \tag{19}$$

The maximum and minimum of the two SNRs of the two Rx antennas in both linear and dB scale may be calculated as follows in Equations (20) to (23):

$$SNR_{max} = \max(SNR_0, SNR_1) \tag{20}$$

$$SNR_{min} = \min(SNR_0, SNR_1) \tag{21}$$

$$SNR_{max,dB} = \max(SNR_{0,dB}, SNR_{1,dB}) \tag{22}$$

$$SNR_{min,dB} = \min(SNR_{0,dB}, SNR_{1,dB}) \tag{23}$$

An approximation of the log sum may be calculated as follows in Equations (24) to (29):

$$SNR_{sum,dB} = 10\log_{10}(SNR_{max} + SNR_{min}) \tag{24}$$

$$= 10\log_{10}(SNR_{max}) + 10\log_{10}\left(1 + \frac{SNR_{min}}{SNR_{max}}\right) \tag{25}$$

$$= SNR_{max,dB} + 10\log_{10}\left(2 + \frac{SNR_{min} - SNR_{max}}{SNR_{max}}\right) \tag{26}$$

$$= SNR_{max,dB} + 3 + 10\log_{10}\left(1 + \frac{SNR_{min} - SNR_{max}}{2SNR_{max}}\right) \tag{27}$$

$$\cong SNR_{max,dB} + 3 + \frac{10\frac{SNR_{min} - SNR_{max}}{2SNR_{max}}}{\log_e 10} \tag{28}$$

$$= SNR_{max,dB} + 3 + \frac{5\left(\frac{SNR_{min}}{SNR_{max}} - 1\right)}{\log_e 10} \tag{29}$$

The last term $$\frac{5\left(\frac{SNR_{min}}{SNR_{max}} - 1\right)}{\log_e 10}$$

only depends on $$\frac{SNR_{min}}{SNR_{max}},$$

which may be implemented by a look up table (LUT) depending on the required precision of the calculation.

Figure 3:
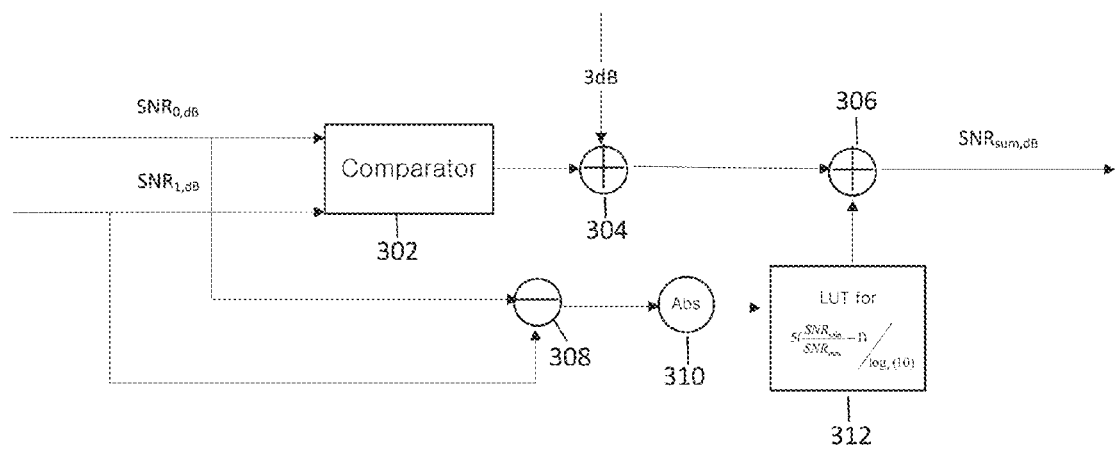
FIG. 3 is a block diagram of a circuit that performs a sum SNR approximation method, according to an embodiment of the present disclosure.

FIG. 3 is a block diagram of a circuit that performs a sum SNR approximation method, according to an embodiment of the present disclosure.

Referring to FIG. 3, a comparator 302 compares two inputs $SNR_{0,dB}$ and $SNR_{1,dB}$ from 2 RX antennas. An adder circuit 304 adds 3 dB to the greater of the two inputs, $SNR_{0,dB}$ and $SNR_{1,dB}$, as determined by the comparator 302. A subtractor 308 subtracts $SNR_{1,dB}$ from $SNR_{0,dB}$. An absolute value Abs block 310 determines an absolute value of the difference between $SNR_{0,dB}$ and $SNR_{1,dB}$. The absolute value of the difference is input to the LUT 312. The compensation value, $SNR_{sum,dB}$, is determined by adding the output value of the LUT 312 to the output value of the adder circuit 304.

According to an embodiment of the present disclosure, the present system and method provides SNR estimation for long training field (LTF) symbols of every packet of a Wi-Fi transceiver such as the transceiver 180. The estimated SNR may be used to determine the smoothing coefficients used during channel smoothing. The estimated SNR may also be used to determine whether a phase limiter is used during common phase error (CPE) estimation block. The present system and method may apply the estimated SNR in log-likelihood ratio (LLR) quantization. The SNR estimation in a Wi-Fi transceiver may be used on the LTF symbols which are repeated twice. The present system and method may implement the SNR estimation in either a time domain or a frequency domain.

According to an embodiment of the present disclosure, the present system and method provides SNR estimation in a time domain. When the phase difference between the first and second LTF symbols is perfectly compensated, the first and second LTF symbols may be represented in a discrete time format respectively as shown in Equations (30) and (31):

$$LTF_{t,1}(i) = h(i)*s(i) + n_1(i) = \Sigma_l h_l \cdot s(i-l) + n_1(i) \quad (30)$$

$$LTF_{t,2}(i) = h(i)*s(i) + n_2(i) = \Sigma_l h_l \cdot s(i-l) + n_2(i) \quad (31)$$

where h(i), s(i) and $n_j(i)$ (j=1, 2) are the channel responses, the time domain LTF samples and the additive white Gaussian noise (AWGN), respectively.

In an AWGN channel, the average power of the sum and difference of the two LTF symbols may be calculated as shown in Equations (32) and (33):

$$P_{sig,t} = \frac{\sum_{i=0}^{N-1}|LTF_{t,1}(i) + LTF_{t,2}(i)|^2}{N} \cong 4\sigma_s^2 + 2\sigma_n^2 \quad (32)$$

$$P_{nois,t} = \frac{\sum_{i=0}^{N-1}|LTF_{t,1}(i) - LTF_{t,2}(i)|^2}{N} \cong 2\sigma_n^2 \quad (33)$$

where h(i)=1, $E[s(i)]^2 = \sigma_s^2$, $E[n_1(i)]^2 = E[n_2(i)]^2 = \sigma_n^2$.
Then the estimated SNR may be calculated as shown in Equation (34):

$$SNR_{dB} = 10 \cdot \log_{10} \frac{1}{2}\left(\frac{P_{sig,t}}{P_{nois,t}} - 1\right) \quad (34)$$

Figure 4:
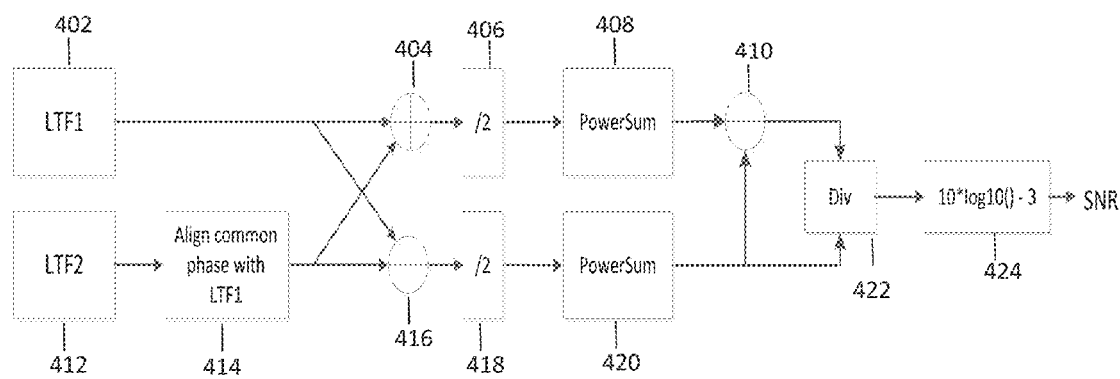
FIG. 4 is a block diagram of a circuit that performs time domain SNR estimation method using a power sum, according to an embodiment of the present disclosure.

FIG. 4 is a block diagram of a circuit that performs a time domain SNR estimation method, according to an embodiment of the present disclosure.

Referring to FIG. 4, a circuit that performs a time domain SNR estimation method includes a first LTF symbol LTF1 402, a second LTF symbol LTF2 412, a phase aligner block 414, an adder block 404, a first divider block 406, a second divider block 418, a first subtractor block 416, a second subtractor block 410, a first powersum block 408, a second powersum block 420, a third divider block 422, and a dB conversion block 424.

Referring to FIG. 4, the first and second LTF symbols LTF1 402 and LTF2 412 are processed. The phase aligner block 414 aligns the common phase of LTF2 412 with LTF1 402. The adder block 404 adds LTF1 402 and phase aligned LTF2 from the phase aligner block 414. The first subtractor block 416 subtracts the phase aligned LTF2 from the LTF1 402. The first divider block 406 divides the output from the adder block 404 by two. The second divider block 418 divides the output from the first subtractor block 416 by two. The outputs of the first divider block 406 and the second divider block 418 are provided to the first and second powersum blocks 408 and 420 respectively. For a sequence of complex numbers, $x_i$, where i=0 . . . n−1 The powersum block calculates $\Sigma_{i=0}^{n-1} Re\{x_i\}^2 + Im\{x_i\}^2$. The second subtractor block 410 subtracts the output of the second powersum block 420 from the output of the first powersum block 408. The third divider block 422 divides the output of the second subtractor block 410 by the output of the second powersum block 420. The dB converter block 424 converts the output of the third divider block 422 to a dB value representing the SNR of LTF1 402 and LTF2 412.

According to another embodiment, the present system provides SNR estimation in a frequency domain. Instead of averaging over the time domain samples, the average is taken over frequency domain subcarriers.

Since the LTF symbol uses a pseudo random sequence in the frequency domain, the time domain sample, s(i), may be approximated as an independent and identically distributed circular symmetric Gaussian random variable, CN(0, $\sigma_s^2$). Under an AWGN channel, (h(i)=1), the time domain sample may be calculated as shown in Equations (42) and (43):

$$LTF_{t,1}(i) = s(i) + n_1(i) \quad (42)$$

$$LTF_{t,2}(i) = s(i) + n_2(i) \quad (43)$$

The sum of the ith samples of the two LTF symbols may be calculated as shown in Equation (44):

$$y(i) = LTF_{t,1}(i) + LTF_{t,2}(i) \quad (44)$$

Since $s_1(i)$, $s_2(i)$, $n_1(i)$, $n_2(i)$ are independent Gaussian random variables, $y(i)$ is $CN(0,4\sigma_s^2+2\sigma_n^2)$. The magnitude of $y(i)$, i.e., $|y(i)|$ is a Rayleigh random variable. Based on the property of a Rayleigh random variable, $$E[|y(i)|] = \frac{\sqrt{\pi}}{2}\sqrt{4\sigma_s^2 + 2\sigma_n^2}.$$

The absolute value sum $A_{sig,t}$ of the signal and the absolute value sum $A_{nois,t}$ of the noise may be computed using the law of large numbers as shown in Equation (45):

$$A_{sig,t} = \frac{\sum_{i=0}^{N-1}|LTF_{t,1}(i) + LTF_{t,2}(i)|}{N} \cong \frac{\sqrt{\pi}}{2}\sqrt{4\sigma_s^2 + 2\sigma_n^2} \quad (45)$$

$$A_{nois,t} = \frac{\sum_{i=0}^{N-1}|LTF_{t,1}(i) - LTF_{t,2}(i)|}{N} \cong \frac{\sqrt{\pi}}{2}\sqrt{2\sigma^2}$$

The actual SNR calculation may be computed as shown in Equation (46):

$$SNR_{dB} = 10 \cdot \log_{10}\left(\frac{A_{sig,t}^2 - A_{nois,t}^2}{2 \cdot A_{nois,t}^2}\right) \quad (46)$$

If an absolute value sum and logarithm calculation are used in LTF, Equation (46) may be calculated as shown in Equation (47):

$$SNR_{dB}=10 \cdot \log_{10}(A_{sig,t}+A_{nois,t})+10 \cdot \log_{10}(A_{sig,t}-A_{nois,t})-20 \cdot \log_{10}(A_{nois,t})-3 \quad (47)$$

Figure 5:
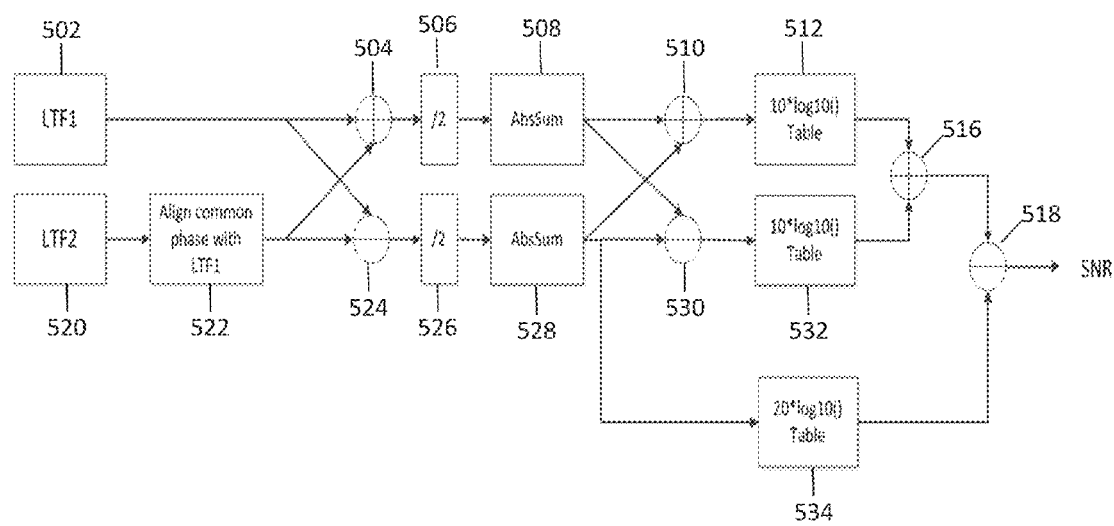
FIG. 5 is a block diagram of a circuit that performs time domain SNR estimation method using an absolute value sum, according to an embodiment of the present disclosure.

FIG. 5 is a block diagram of a circuit that performs time domain SNR estimation method using an absolute value sum, according to an embodiment of the present disclosure.

Referring to FIG. 5, a circuit that performs a time domain SNR estimation method includes a first LTF symbol LTF1 502, a second LTF symbol LTF2 520, a phase aligner block 522, a first adder block 504, a second adder block 510, a third adder block 516, a first divider block 506, a second divider block 526, a first subtractor block 524, a second subtractor block 530, a third subtractor block 518, a first absolute value sum block 508, a second absolute value sum block 528, a first dB conversion block 512, a second dB conversion block 532, and a third dB conversion block 534.

Referring to FIG. 5, the first and second LTF symbols LTF1 502 and LTF2 520 are processed. The phase aligner block 522 aligns the common phase of LTF2 520 with that of LTF1 502. The first adder block 504 adds LTF1 502 and phase aligned LTF2 from the phase aligner block 522. The first subtractor block 524 subtracts the phase aligned LTF2 from the LTF1 502. The first divider block 506 divides the output from the adder block 504 by two. The second divider block 526 divides the output from the first subtractor block 524 by two. The outputs of the first divider block 506 and the second divider block 526 are provided to the first and second absolute value sum blocks 508 and 528 respectively. The second subtractor block 530 subtracts the output of the second absolute value sum block 528 from the output of the first absolute value sum block 508. The second adder block 510 adds the output of the second absolute value sum block 528 to the output of the first absolute value sum block 508.

The first dB conversion block 512 converts the output of the second adder block 510 to a dB value. The second dB conversion block 532 converts the output of the second subtractor block 530 to a dB value. The third dB conversion block 534 converts the output of the second absolute value sum block 528 to a dB value. The third adder block 516 adds the output of the first dB conversion block 512 and the output of the second dB conversion block 532. The third subtractor block 518 subtracts the output of the third dB conversion block 534 from the output of the third adder block 516. The output of the third subtractor block 518 is a dB value representing the SNR of LTF1 502 and LTF2 520.

Figure 6:
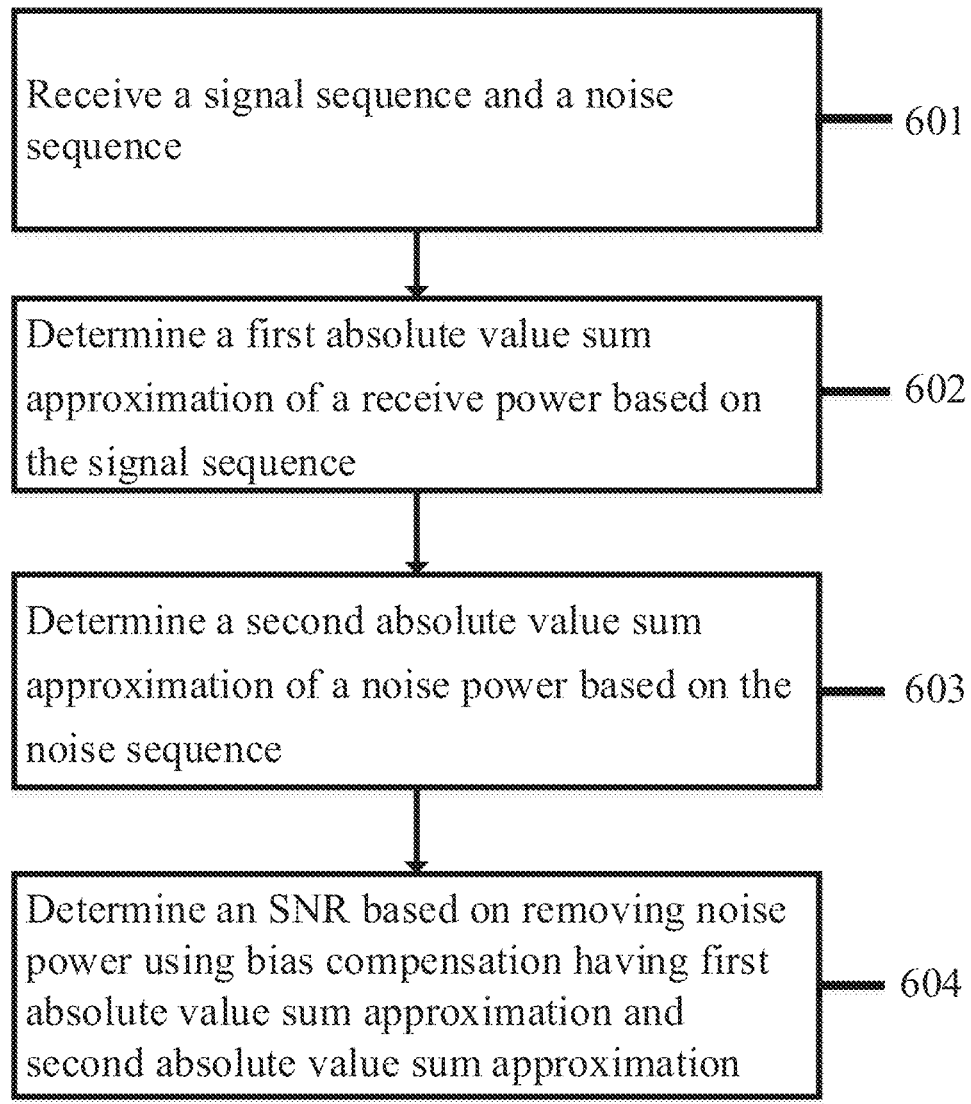
FIG. 6 is a flowchart of a method of determining an SNR, according to an embodiment of the present disclosure.

FIG. 6 is a flowchart of a method of determining a signal to noise ratio, according to an embodiment of the present disclosure Referring to the flowchart of FIG. 6, the present system, at 601, receives a signal sequence and a noise sequence. At 602, the present system determines a first absolute value sum approximation of a receive power based on the signal sequence. At 603, the present system determines a second absolute value sum approximation of a noise power based on the noise sequence. At 604, the present system determines an SNR based on removing noise power using bias compensation having first absolute value sum approximation and second absolute value sum approximation.

Figure 7:
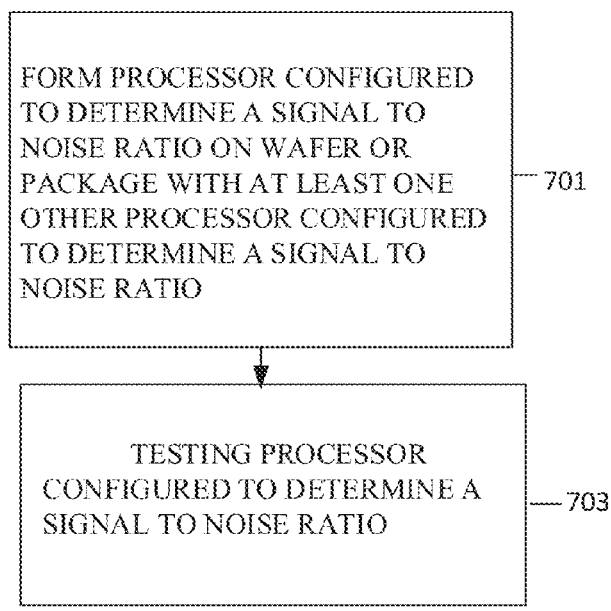
FIG. 7 is a flowchart of a method of testing a processor configured to determine an SNR, according to an embodiment of the present disclosure.

FIG. 7 is a flowchart of a method of testing a processor configured to determine an SNR according to an embodiment of the present disclosure, where the processor is either implemented in hardware or implemented in hardware that is programmed with software.

Referring to FIG. 7, the method, at 701, forms the processor as part of a wafer or package that includes at least one other processor. The processor is configured to receive a signal sequence and a noise sequence, determine a first absolute value sum approximation of a receive power of the signal sequence, determine a second absolute value sum approximation of a noise power of the noise sequence, and determine a signal-to-noise ratio (SNR) based on the first absolute value sum approximation and the second absolute value sum approximation.

At 703, the method tests the processor, which includes testing the processor and the at least one other processor using one or more electrical to optical converters, one or more optical splitters that split an optical signal into two or more optical signals, and one or more optical to electrical converters.

Figure 8:
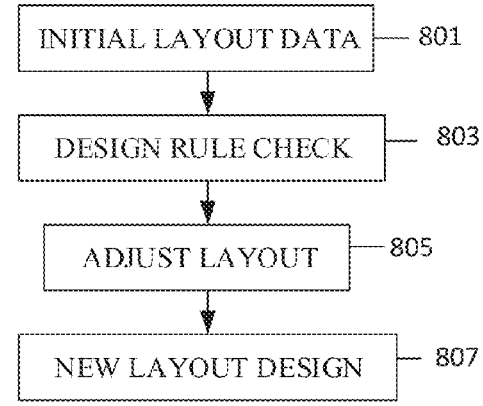
FIG. 8 is a flowchart of a method of manufacturing a processor configured to determine an SNR, according to an embodiment of the present disclosure.

FIG. 8 is a flowchart of a method of manufacturing a processor configured to determine an SNR, according to an embodiment of the present disclosure.

Referring to FIG. 8, the method, at 801, includes an initial layout of data in which the method generates a mask layout for a set of features for a layer of an integrated circuit. The mask layout includes standard cell library macros for one or more circuit features that include a processor. The processor is configured to receive a signal sequence and a noise sequence, determine a first absolute value sum approximation of a receive power of the signal sequence, determine a second absolute value sum approximation of a noise power of the noise sequence, and determine a signal-to-noise ratio (SNR) based on the first absolute value sum approximation and the second absolute value sum approximation.

At 803, there is a design rule check in which the method disregards relative positions of the macros for compliance to layout design rules during the generation of the mask layout.

At 805, there is an adjustment of the layout in which the method checks the relative positions of the macros for compliance to layout design rules after generating the mask layout.

At 807, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the scope of the present disclosure as defined by the appended claims and their equivalents.

What is claimed is:

1. A method, comprising:
   receiving a signal sequence and a noise sequence;
   determining a first sum of absolute values of a receive power of the signal sequence, wherein the signal sequence contains both signal and noise;
   determining a second sum of absolute values of a noise power of the noise sequence; and
   determining a signal-to-noise ratio (SNR) based on bias compensation,
   wherein the bias compensation includes summing a first decibel term and a second decibel term,
   wherein the first decibel term is based on converting a result of a summation of the first sum of absolute values and the second sum of absolute values into a decibel domain, and
   wherein the second decibel term is based on converting a result of a subtraction of the second sum of absolute values from the first sum of absolute values into the decibel domain.

2. The method of claim 1, further comprising summing a first SNR and a second SNR in a decibel domain.

3. The method of claim 2, wherein the first SNR and the second SNR are associated with at least one of two frequency bands, two time slots, and two antennas.

4. The method of claim 1, wherein converting the result of the summation of the first sum of absolute values and the second sum of absolute values into the decibel domain and converting the result of the subtraction of the second sum of absolute values from the first sum of absolute values into the decibel domain comprises using a look-up table (LUT) stored in a memory.

5. The method of claim 2, further comprising determining the greater of the first SNR and the second SNR using a comparator.

6. The method of claim 5, further comprising adding 3 dB to the greater of the first SNR and the second SNR.

7. The method of claim 2 further comprising determining an absolute value of the difference between the first SNR and the second SNR.

8. An apparatus, comprising:
   a memory;
   a processor; and
   a receiver configured to:
   receive a signal sequence and a noise sequence,
   determine a first sum of absolute values of a receive power of the signal sequence, wherein the signal sequence contains both signal and noise,
   determine a second sum of absolute values of a noise power of the noise sequence, and
   determine a signal-to-noise ratio (SNR) based on bias compensation,
   wherein the bias compensation includes summing a first decibel term and a second decibel term,
   wherein the first decibel term is based on converting a result of a summation of the first sum of absolute values and the second sum of absolute values into a decibel domain, and
   wherein the second decibel term is based on converting a result of a subtraction of the second sum of absolute values from the first sum of absolute values into the decibel domain.

9. The apparatus of claim 8, wherein the receiver is further configured to sum a first SNR and a second SNR in a decibel domain.

10. The apparatus of claim 9, wherein the first SNR and the second SNR are associated with at least one of two frequency bands, two time slots, and two antennas.

11. The apparatus of claim 8, wherein the receiver is further configured to convert the result of the summation of the first sum of absolute values and the second sum of absolute values into the decibel domain and convert the result of the subtraction of the second sum of absolute values from the first sum of absolute values into the decibel domain comprises using a look-up table (LUT) stored in a memory.

12. The apparatus of claim 9, wherein the receiver is further configured to determine the greater of the first SNR and the second SNR using a comparator.

13. The apparatus of claim 12, wherein the receiver is further configured to add 3 dB to the greater of the first SNR and the second SNR.

14. The apparatus of claim 9, wherein the receiver is further configured to determine an absolute value of the difference between the first SNR and the second SNR.

15. A method of manufacturing a processor, comprising:
   forming the processor as part of a wafer or package that includes at least one other processor, wherein the processor is configured to receive a signal sequence and a noise sequence, determine a first sum of absolute values of a receive power of the signal sequence, wherein the signal sequence contains both signal and noise, determine a second sum of absolute values of a noise power of the noise sequence, and determine a signal-to-noise ratio (SNR) based on bias compensation,
   wherein the bias compensation includes summing a first decibel term and a second decibel term,
   wherein the first decibel term is based on converting a result of a summation of the first sum of absolute values and the second sum of absolute values into a decibel domain, and
   wherein the second decibel term is based on converting a result of a subtraction of the second sum of absolute values from the first sum of absolute values into the decibel domain.

16. A method of constructing an integrated circuit, comprising:
   generating a mask layout for a set of features for a layer of the integrated circuit, wherein the mask layout includes standard cell library macros for one or more circuit features that include a memory, a processor, and a receiver configured to receive a signal sequence and a noise sequence, determine a first sum of absolute values of a receive power of the signal sequence, wherein the signal sequence contains both signal and noise, determine a second sum of absolute values of a noise power of the noise sequence, and determine a signal-to-noise ratio (SNR) based on bias compensation, wherein the bias compensation includes summing a first decibel term and a second decibel term, wherein the first decibel term is based on converting a result of a summation of the first sum of absolute values and the second sum of absolute values into a decibel domain, and wherein the second decibel term is based on converting a result of a subtraction of the second sum of absolute values from the first sum of absolute values into the decibel domain.

* * * * *